(12) United States Patent
Silk et al.

(10) Patent No.: US 10,976,761 B2
(45) Date of Patent: Apr. 13, 2021

(54) ELECTRICAL HEATER FOR FLOW CONTROL DEVICE

(71) Applicant: Swagelok Company, Solon, OH (US)

(72) Inventors: Kevin Silk, Stow, OH (US); Andrew Creque, Macedonia, OH (US)

(73) Assignee: SWAGELOK COMPANY, Solon, OH (US)

( * ) Notice: Subject to any disclaimer, the term of this patent is extended or adjusted under 35 U.S.C. 154(b) by 197 days.

(21) Appl. No.: 16/194,588

(22) Filed: Nov. 19, 2018

(65) Prior Publication Data

US 2019/0155321 A1 May 23, 2019

Related U.S. Application Data

(60) Provisional application No. 62/589,216, filed on Nov. 21, 2017.

(51) Int. Cl.
*H05B 1/02* (2006.01)
*G05D 23/24* (2006.01)
(Continued)

(52) U.S. Cl.
CPC ......... *G05D 23/2451* (2013.01); *F24H 1/102* (2013.01); *F24H 9/2028* (2013.01); *G05D 23/24* (2013.01); *H05B 1/0244* (2013.01)

(58) Field of Classification Search
CPC ...... H05B 1/0269; H05B 1/0244; H05B 1/02; G05D 23/2457; G03D 23/24; F24H 1/102; F24H 9/2028
(Continued)

(56) References Cited

U.S. PATENT DOCUMENTS 6,080,973 A * 6/2000 Thweatt, Jr. .......... F24H 9/0047
219/497
6,389,226 B1 * 5/2002 Neale ...................... F24H 1/102
392/485
(Continued)

FOREIGN PATENT DOCUMENTS

CH 711968 6/2017
JP 5717047 5/2015

OTHER PUBLICATIONS

Kev Series Electrically Heated Vaporizing Pressure Reducing Regulators, Swagelok Company, Dec. 2017, Rev E., 3 pgs.
(Continued)

*Primary Examiner* — Mark H Paschall
(74) *Attorney, Agent, or Firm* — Calfee, Halter & Griswold LLP (57) ABSTRACT

A fluid heater includes a heating circuit, a temperature monitoring circuit, a controller, and an overheat sensing element. The controller is disposed in a control unit and is in circuit communication with a temperature gauge and a power supply switch, the controller being configured to operate the power supply switch in response to feedback from the temperature gauge to maintain the heater at a setpoint temperature. The overheat sensing element is disposed in a heater housing proximate to a thermal fuse and is in circuit communication with the controller to provide an indication to the controller when the overheat sensing element reaches an overheat temperature lower than the critical temperature. The controller is configured to operate the power supply switch to reduce or shut off power to the heating element in response to receiving the indication that the overheat sensing element has reached the overheat temperature.

20 Claims, 5 Drawing Sheets

(51) Int. Cl.
*F24H 9/20* (2006.01)
*F24H 1/10* (2006.01)

(58) Field of Classification Search
USPC .......................... 219/505, 494, 481, 497, 507
See application file for complete search history.

(56) References Cited

U.S. PATENT DOCUMENTS

| | | | |
|---|---|---|---|
| 6,728,600 B1* | 4/2004 | Contaldo | F23N 5/203 |
| | | | 700/274 |
| 2010/0180959 A1 | 7/2010 | Patterson | |
| 2013/0108249 A1* | 5/2013 | Krause | B67D 3/0022 |
| | | | 392/465 |
| 2014/0233928 A1* | 8/2014 | Moughton | F24H 1/142 |
| | | | 392/398 |
| 2015/0312963 A1* | 10/2015 | Kiernan | H05B 3/58 |
| | | | 219/483 |
| 2016/0349773 A1* | 12/2016 | Borowicz | H05B 1/02 |

OTHER PUBLICATIONS

Pressure Regulators K Series, Swagelok Company, 59 pgs., Dec. 2017.
International Search Report and Written Opinion from PCT/US2018/061739 dated Feb. 28, 2019.

* cited by examiner

ELECTRICAL HEATER FOR FLOW CONTROL DEVICE

CROSS-REFERENCE TO RELATED APPLICATION

This application claims priority to and all benefit of U.S. Provisional Patent Application Ser. No. 62/589,216, filed on Nov. 21, 2017, for ELECTRICAL HEATER FOR FLOW CONTROL DEVICE, the entire disclosure of which is fully incorporated herein by reference.

TECHNICAL FIELD OF THE DISCLOSURE

The inventions relate to heated fluid delivery arrangements, and more particularly to flow control devices that are adapted to control fluid delivery including liquid or gaseous fluid.

BACKGROUND

Regulators and other fluid control devices are often used to step down process line pressures (e.g., up to 5000 psig) to instrument pressures (e.g., up to 100 psig), for example, to allow for analysis or measurement of the process fluid, such as, for example, natural gas or petrochemical process fluids. This significant reduction in pressure may also cause a decrease in temperature due to the Joule-Thomson effect which can also cause condensation of gases, which is often undesirable for gas entering instrumentation systems.

To counter the Joule-Thomson effect and reduce the condensation of gas, a fluid heater may be provided in the fluid system. While the heater may be provided in series with a flow control device experiencing the pressure drop, in some embodiments, a fluid heater is integrated into a flow control device, such that the heater is in direct contact with the process medial within the flow control device, for maximum thermal efficiency. One example of such a heated flow control device is the KEV Series Electrically Heated Vaporizing Pressure-Reducing Regulator, manufactured by Swagelok Co. and described in the Pressure Regulators—K Series catalog (MS-02-230, Rev L), which is incorporated by reference herein in its entirety.

SUMMARY

In an exemplary embodiment of the present application, a fluid heater includes a heating circuit, a temperature monitoring circuit, a controller, and an overheat sensing element. The heating circuit includes a heating element and a thermal fuse disposed in a heater housing, and a power supply switch disposed in a control unit, the thermal fuse being configured to fail at a predetermined critical temperature. The temperature monitoring circuit comprising a thermistor disposed in the heater housing proximate the heating element, and a temperature gauge disposed in the control unit. The controller is disposed in the control unit and is in circuit communication with the temperature gauge and the power supply switch, the controller being configured to operate the power supply switch in response to feedback from the temperature gauge to maintain the heater at a setpoint temperature. The overheat sensing element is disposed in the heater housing proximate to the thermal fuse and is in circuit communication with the controller to provide an indication to the controller when the overheat sensing element reaches an overheat temperature lower than the critical temperature. The controller is configured to operate the power supply switch to reduce or shut off power to the heating element in response to receiving the indication that the overheat sensing element has reached the overheat temperature.

In another exemplary embodiment of the present application, a method of controlling temperature in a fluid control device is contemplated. In the exemplary method, power is supplied on a power supply circuit to a heating element in the fluid control device to heat fluid passing through the fluid control device, the power supply circuit including a thermal fuse configured to fail at a predetermined critical temperature to open the heating circuit when the thermal fuse reaches the critical temperature. The power supply to the heating element is controlled based on feedback from a thermistor proximate the heating element to maintain the heating element at a setpoint temperature. An overheat temperature is sensed proximate the thermal fuse, the overheat temperature being lower than the critical temperature. Power to the heating element is automatically reduced or shut off in response to sensing the overheat temperature.

In another exemplary embodiment of the present application, a heated regulator includes a body comprising an internal passage extending between an inlet port and an outlet port, a body seat, and a cavity extending to an access port in the body, a poppet movable with respect to the body seat to control fluid flow through the internal passage, and a heater. The heater includes a heater housing installed in the cavity through the access port, a heating circuit, a temperature monitoring circuit, a controller, and an overheat sensing element. The heating circuit includes a heating element and a thermal fuse disposed in a heater housing, and a power supply switch disposed in a control unit, the thermal fuse being configured to fail at a predetermined critical temperature. The temperature monitoring circuit comprising a thermistor disposed in the heater housing proximate the heating element, and a temperature gauge disposed in the control unit. The controller is disposed in the control unit and is in circuit communication with the temperature gauge and the power supply switch, the controller being configured to operate the power supply switch in response to feedback from the temperature gauge to maintain the heater at a setpoint temperature. The overheat sensing element is disposed in the heater housing proximate to the thermal fuse and is in circuit communication with the controller to provide an indication to the controller when the overheat sensing element reaches an overheat temperature lower than the critical temperature. The controller is configured to operate the power supply switch to reduce or shut off power to the heating element in response to receiving the indication that the overheat sensing element has reached the overheat temperature.

DETAILED DESCRIPTION OF EXEMPLARY EMBODIMENTS

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified value and values within 10% of the specified value, unless expressly stated otherwise. Further, it is to be understood that the drawings accompanying the present application may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

Figure 1:
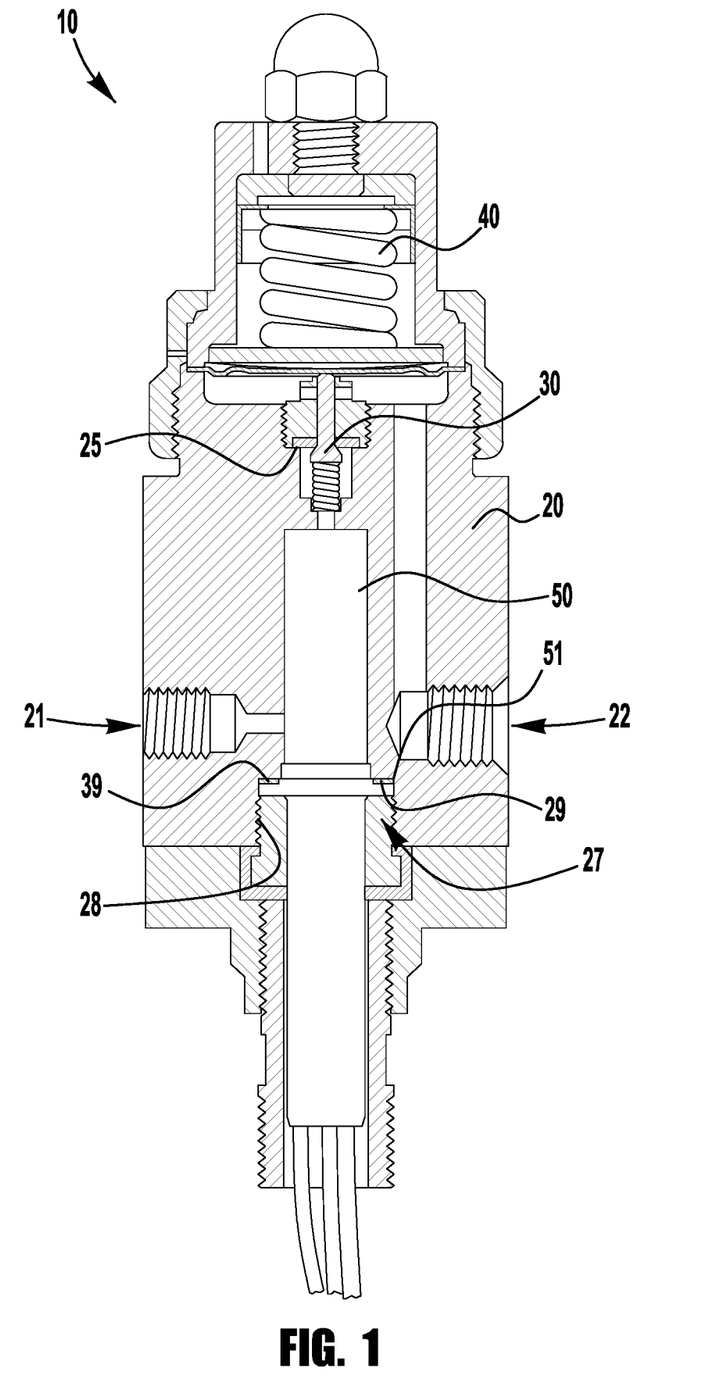
FIG. 1 is a cross-sectional view of an electrically heated regulator.

As shown in FIG. 1, an exemplary heated regulator 10 or other such heated fluid control device includes a body 20 defining an internal passage extending between an inlet port 21 and an outlet port 22, with a body seat 25 that may be integral with or assembled with the body 20. A poppet 30 or other such flow control component is movable with respect to the body seat 25 by counterbalancing spring biasing (supplied by compression adjustable spring 40) and system pressure (supplied by downstream fluid pressure acting on regulator diaphragm or piston) forces to control fluid flow characteristics (e.g., flow rate, outlet pressure). The body 20 further defines a cavity 27 between the inlet and outlet ports 21, 22 and extending to an access port 28 for receiving a fluid heater 50 therein. The heater 50 includes an outer flange 51 received in a counterbore 29 of the access port 28 for compression of a seal member 39 (e.g., a metal C-seal) to provide a seal between the body 20 and the heater 50. In the exemplary embodiment, the cavity 27 is disposed upstream of the body seat 25; in other embodiments (not shown), the cavity may be disposed downstream of the body seat. The heater 50 is sized to define a space between an outer surface of the fluid heater and an interior surface of the cavity 27, for passage of the system fluid through the space. In a vaporizing regulator application where the liquid fluid is converted to gas due to the pressure drop across the body seat, as the fluid passes through the space around the heater, the fluid is heated ahead of the pressure drop to get the liquid close to its bubble point to ensure a complete vaporization across the pressure drop.

Figure 2:
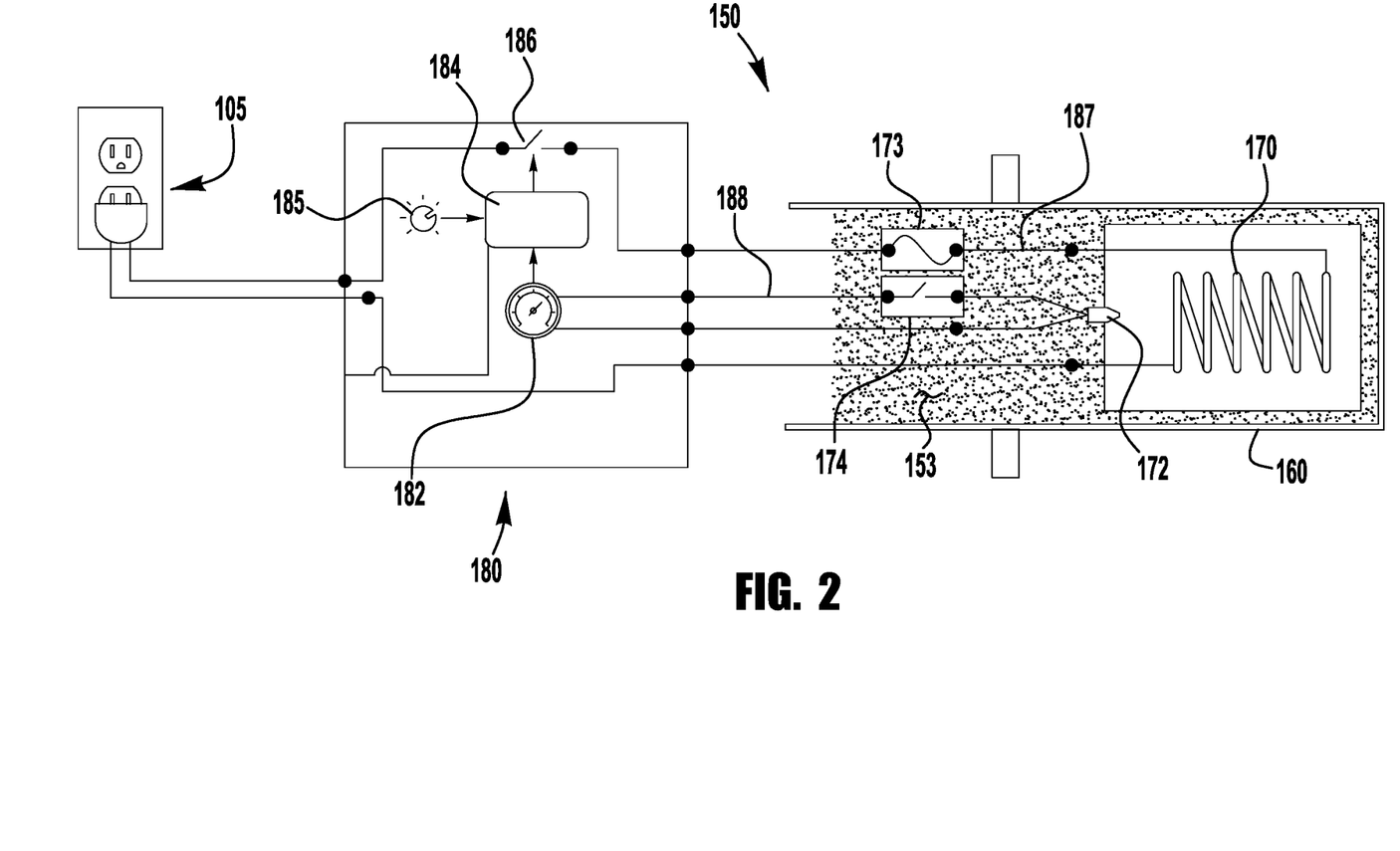
FIG. 2 is a schematic cross-sectional view of a fluid heater for an electrically heated flow control device, in accordance with an exemplary embodiment of the present application.

As shown in the schematic view of FIG. 2, an exemplary fluid heater 150 includes a hollow, closed-ended elongated housing or sheath 160 within which a heating element 170 (e.g., heating coil) is disposed. The heating element is embedded in a thermally conductive cement or potting compound 153 (e.g., a thermally conductive potting compound manufactured by Sauereisen) to protect the heating element (and other electrical components of the heater) while maximizing heat transfer to the outer surface of the sheath 160. The heating element 170 is in circuit communication with a powered control unit 180, in a heating circuit 187 to selectively supply electrical power to the heating element from a power supply 105 (e.g., an external power supply, such as a power outlet, or an internal power supply, such as a battery) to maintain the system fluid at a desired temperature. The heater 150 includes a thermistor 172 proximate to the heating element 170 and in circuit communication with a temperature gauge 182 in the control unit 180, in a temperature monitoring circuit 188, for monitoring of the heater temperature at the thermistor 172. The exemplary control unit 180 further includes a proportional-integral-derivative (PID) controller 184 in communication with the temperature gauge 182 and a user operable setpoint element 185 (e.g., knob, keypad, etc.) for adaptive control of the heating element, through control of a power supply switch 186 in the heating circuit 187, in response to feedback temperature monitoring signals from the thermistor 172 and temperature setting signals from the setpoint element 185. In one embodiment, the PID controller 184 may be programmed to actuate the switch 186 to provide pulsed power to the heating element 170, with the pulsed power being modulated by the PID controller based on the temperature gauge feedback and user operated setpoint element setting. In other embodiments, the PID controller may be programmed with a default temperature setpoint setting, overriding or replacing the user operable setpoint element setting.

To ensure proper operation of an electrically heated fluid control device, for example, for compliance with explosive atmosphere/hazardous location certification standards (e.g., ATEX, IECEx, and CSA), maximum ambient temperatures are maintained through use of a thermal fuse 173 (e.g., model TCO thermal fuse, manufactured by Cantherm Dong Yang Electronics) disposed in the heater sheath 160 and connected in circuit communication with the heating circuit 187, such that exposure of the thermal fuse to temperatures exceeding a rated critical temperature (e.g., 128-156° C.) causes the thermal fuse 173 to fail, thereby opening the heating circuit 187 and disabling the heating element 170. In some applications, for example, due to extreme pressure drops across the regulator, Joule-Thomson effect icing of the regulator downstream from the body seat may still occur despite operation of the heater 150, resulting in heat transfer away from the heater and into the regulator body, causing continuous operation of the heater and excessive temperatures within the heater sufficient to cause the thermal fuse to fail. In many electrically heated regulator embodiments, the potted condition of the thermal fuse prevents the ability to merely replace the thermal fuse within the heater, such that the entire heater must be replaced.

According to an exemplary aspect of the present application, a fluid heater for a fluid control device may be provided with an overheat sensing element proximate to (e.g., abutting) the thermal fuse and in circuit communication with the controller, to identify conditions in which the thermal fuse is exposed to a temperature that is approaching (e.g., within about 5-10° C. of) the functioning temperature of the thermal fuse, for automatic shutoff of the heating element by the controller.

Many different types of overheat sensing element and circuit arrangements may be utilized to detect and eliminate an overheat condition. In one embodiment, as shown in FIG. 2, a thermal switch 174 may be provided in the temperature monitoring circuit 188, in series with the thermistor 172, and adjacent to (e.g., abutting) the thermal fuse 173 in the heater sheath 160. The thermal switch 174 may be, for example, a bimetallic thermal switch (e.g., model no. JP62, manufactured by Uchiya) having an open temperature lower than (e.g., about 15-25° C. lower than, or approximately 20° C. lower than) the functioning or fail temperature of the thermal fuse 173, such that the thermal switch opens before the temperature at or near the thermal fuse reaches the functioning temperature of the thermal fuse. When the temperature at the thermal switch reaches the open or overheat temperature, the thermal switch 174 is opened to interrupt transmission of the temperature feedback signal from the thermistor 172 to the PID controller 184 via the temperature gauge 182. The PID controller 184 may be programmed to open the power supply switch 186 (shutting off power to the heating element 170) and suspend pulsed actuation of the power supply switch in response to the interrupted transmission of the temperature feedback signal. When the temperature at the thermal switch 174, 174a drops below the closing temperature of the thermal switch 174 or the reactivation temperature (e.g., approximately 30° C. below the open temperature, for example, about 90° C.), the thermal switch closes and the temperature feedback signal from the thermistor 172 to the PID controller 184 resumes, with the PID controller being programmed to then resume pulsed actuation of the power supply switch 186 for operating the heating element 170 based on the temperature feedback and temperature setting signals supplied to the PID controller 184.

Figure 2A:
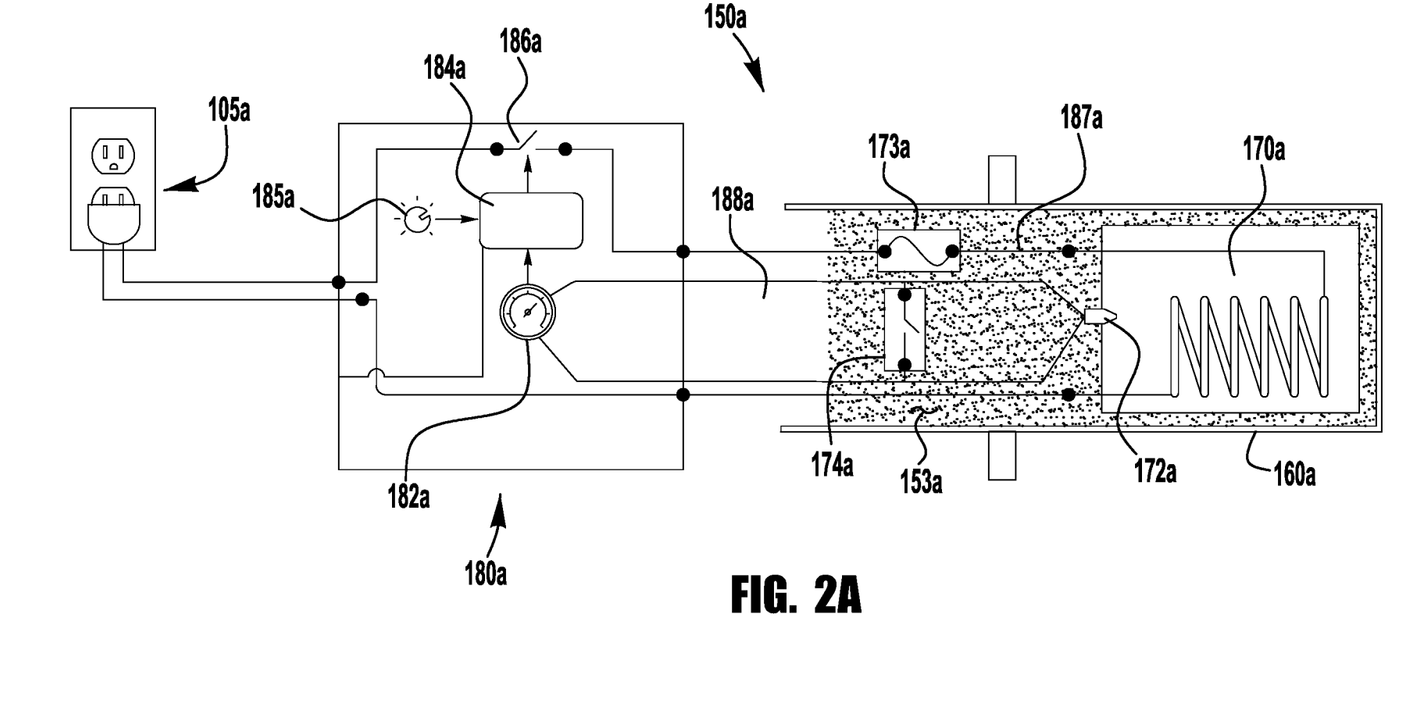
FIG. 2A is a schematic cross-sectional view of a fluid heater for an electrically heated flow control device, in accordance with another exemplary embodiment of the present application

In an alternative embodiment, as shown in FIG. 2A, a heater 150a may be provided with a temperature monitoring circuit 188a having a normally open thermal switch 174a provided in parallel with a thermistor 172a, such that when the temperature at the thermal switch reaches the overheat temperature, the thermal switch 174a closes to short out the thermistor 172a, thereby interrupting transmission of the temperature feedback signal to the PID controller 184a. The PID controller 184a may be programmed to open the power supply switch 186a (shutting off power to the heating element 170) and suspend pulsed actuation of the power supply switch in response to the interrupted transmission of the temperature feedback signal. When the temperature at the thermal switch 174a drops below the opening temperature of the thermal switch 174a or the reactivation temperature, the thermal switch opens and the temperature feedback signal from the thermistor 172a to the PID controller 184a resumes, with the PID controller being programmed to then resume pulsed actuation of the power supply switch 186a for operating the heating element 170a based on the temperature feedback and temperature setting signals supplied to the PID controller 184a.

Figure 3:
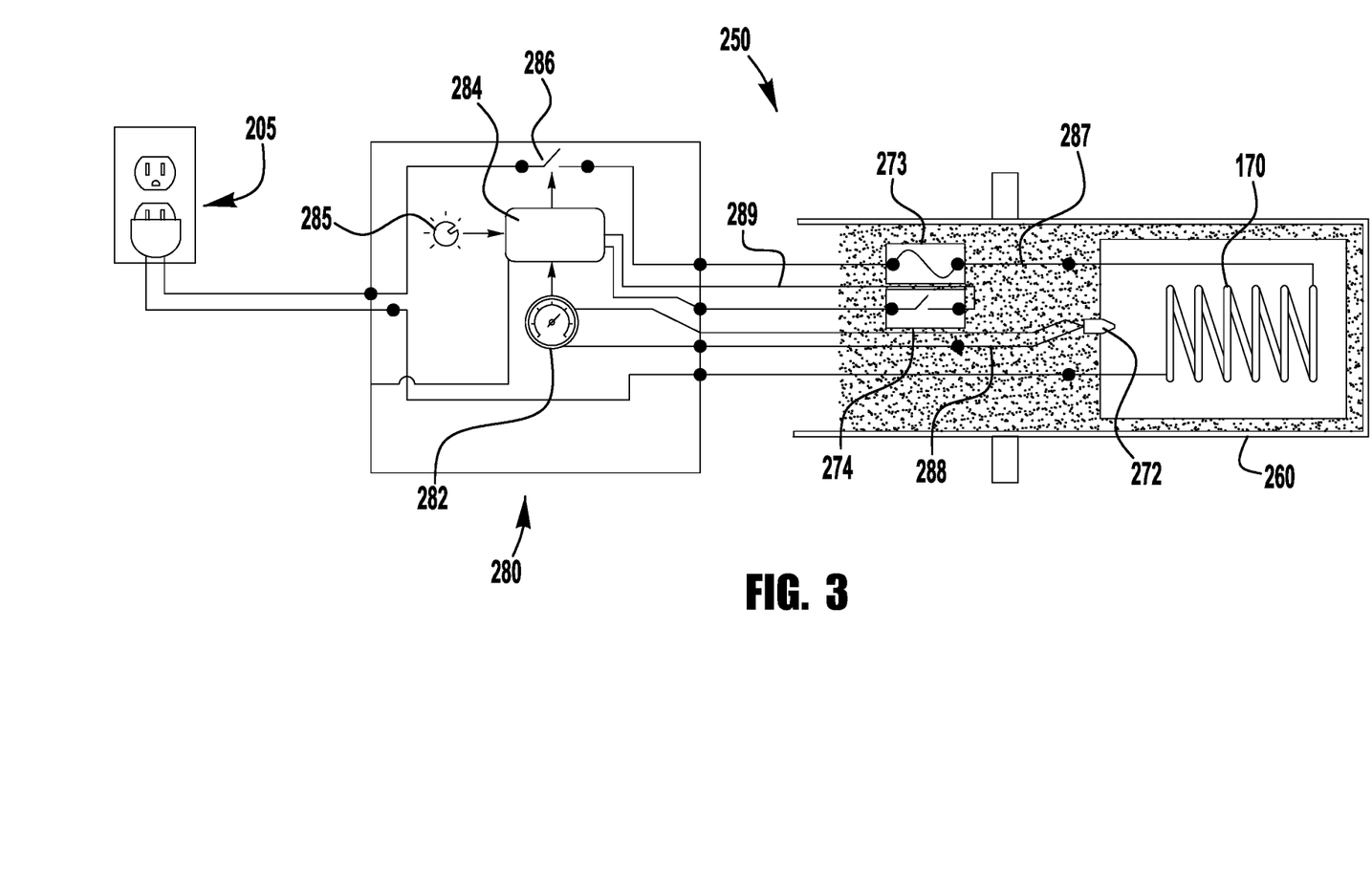
FIG. 3 is a schematic cross-sectional view of a fluid heater for an electrically heated flow control device, in accordance with another exemplary embodiment of the present application.

In another embodiment, an overheat sensing thermal switch may be provided in an overheat sensing circuit separate from the temperature monitoring circuit, for example, to allow for continued controller monitoring of the temperature at the heating element regardless of whether the thermal switch is open or closed. FIG. 3 illustrates an exemplary fluid heater 250 including a thermal switch 274 provided in an overheat sensing circuit 289 separate from a temperature monitoring circuit 288, providing a closed loop verification signal to the PID controller 284 when the thermal switch 274 is closed. When the temperature at the thermal switch 274 reaches the open temperature, the thermal switch 274 is opened to interrupt transmission of the verification signal to the PID controller 284, which may be programmed to control (e.g., reduce or shut off) power to the heating element accordingly. For example, the PID controller 284 may open the power supply switch 286 (shutting off power to the heating element 270) and suspend pulsed actuation of the power supply switch. When the temperature at the thermal switch 274 drops below the closing temperature of the thermal switch, the thermal switch closes and transmission of the verification signal to the PID controller 284 resumes, with the PID controller being programmed to then resume pulsed actuation of the power supply switch 286 for operating the heating element 270 based on the temperature feedback and temperature setting signals supplied to the PID controller 284. As another example, the PID controller 284 may, in response to interruption of the verification signal to the PID controller 284, temporarily or permanently reduce the setpoint temperature and operate the power supply switch 286 to correspond with the reduced setpoint temperature, for example, to more gradually reduce the temperature at the thermal switch.

In another embodiment, an overheat sensing element may include a second or overheat sensing thermistor (e.g., in place of the thermal switch of the embodiment of FIG. 3) provided in an overheat sensing circuit separate from the temperature monitoring circuit, for example, to allow for continued controller monitoring and/or control of the temperatures at or near the heating element and the thermal fuse when the heater is in an overheated condition. This arrangement may allow for user or programmer adjustment of the overheat temperature and reactivation temperature settings, for example, based on preferred safety standards.

Figure 4:
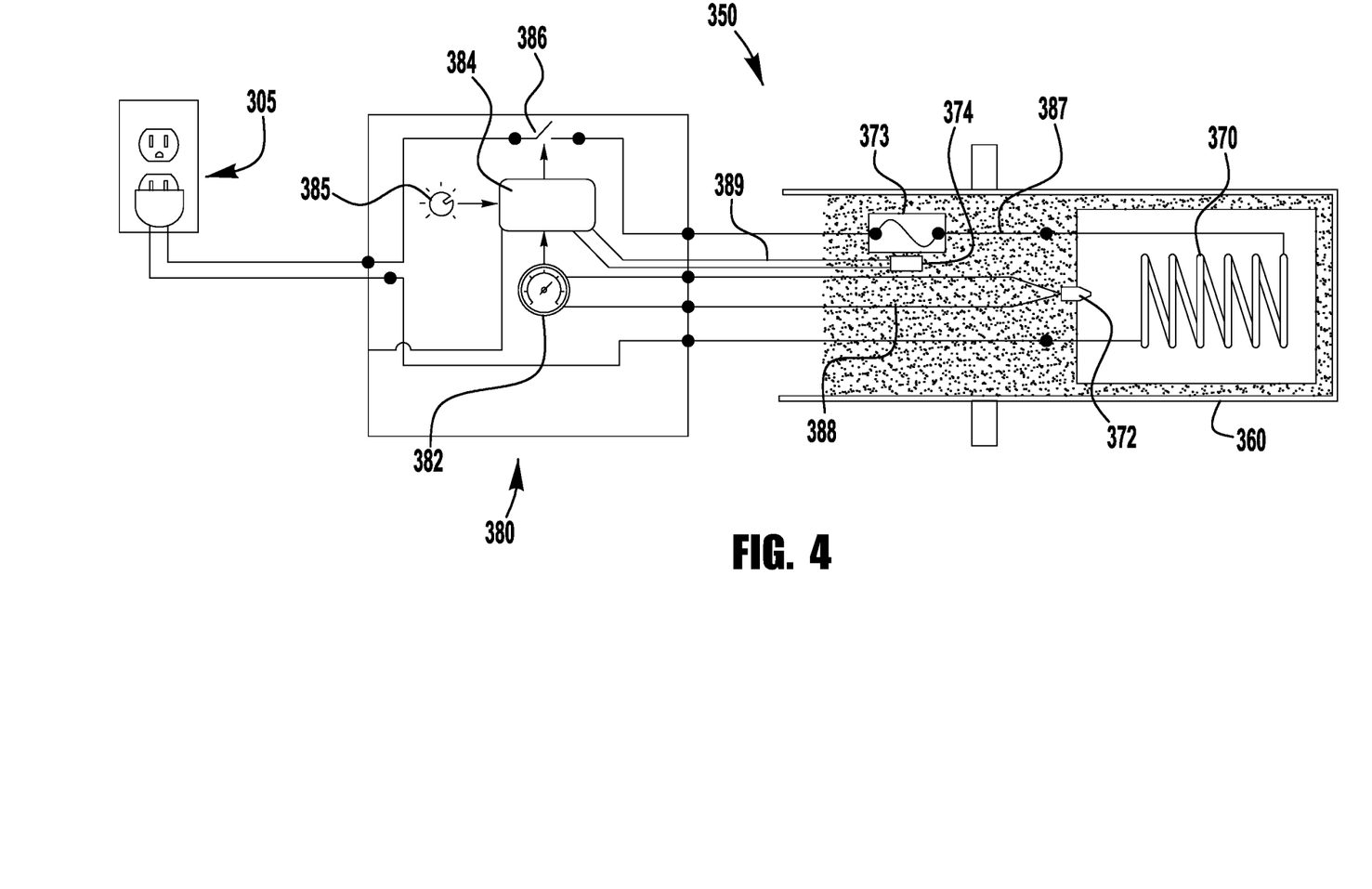
FIG. 4 is a schematic cross-sectional view of a fluid heater for an electrically heated flow control device, in accordance with another exemplary embodiment of the present application.

FIG. 4 illustrates an exemplary fluid heater 350 including an overheat sensing thermistor 374 provided in an overheat sensing circuit 389 separate from a temperature monitoring circuit 388 (which includes the first or heating element sensing thermistor 372), providing an overheat monitoring signal from the overheat sensing thermistor 374 to the PID controller 384. When the overheat monitoring signal indicates to the PID controller 384 that the temperature at the overheat sensing thermistor 374 has reached a predetermined limit or overheat temperature (e.g., within about 8° C. of the functioning temperature of the thermal fuse), the PID controller 384 is programmed to control (e.g., reduce or shut off) power to the heating element accordingly. As one example, the PID controller may open the power supply switch 386 (shutting off power to the heating element 370) and suspend pulsed actuation of the power supply switch. When the temperature at the overheat sensing thermistor 374 drops below a predetermined reactivation temperature (e.g., approximately 30° C. below the limit temperature, for example, about 90° C.), the PID controller 384 is programmed to then resume pulsed actuation of the power supply switch 386 for operating the heating element 370 based on the temperature feedback and temperature setting signals supplied to the PID controller 384. As another example, the PID controller 284 may, in response to an indication that the temperature at the overheat sensing thermistor 374 has reached a predetermined limit or overheat temperature, temporarily or permanently reduce the setpoint temperature and operate the power supply switch 286 to correspond with the reduced setpoint temperature, for example, to more gradually reduce the temperature at the thermal switch.

According to another aspect of the present application, an overheat sensing mechanism and heating element control arrangement (e.g., any of the arrangements of FIGS. 2, 3, and 4, as described herein) may be further configured to automatically reduce the heater temperature setting or setpoint temperature (either a default preset temperature setting programmed in the PID controller or a user supplied temperature setting via a setpoint element) after the fluid heater experiences an overheat initiated shutoff condition, for example, to prevent repeated or recurring shutoffs resulting from regulator icing or other suboptimal system conditions. In some embodiments, this reduced temperature setting may be overridden, reset, or otherwise increased by the user, for example, by adjusting the setpoint element or by shutting off and repowering the heater.

In such an arrangement, the PID controller may be programmed to reduce a stored temperature setting or setpoint temperature by a predetermined percent (e.g., about 10%) or by a predetermined temperature when the PID controller receives an indication of an overheat condition (e.g., open thermal switch in the embodiments of FIGS. 2 and 3, thermistor signal indicating a temperature exceeding the overheat limit temperature in the embodiment of FIG. 4). When the PID controller receives an indication that the temperature at or near the thermal fuse has returned to a reactivation or restart temperature (e.g., re-closed thermal switch in the embodiments of FIGS. 2 and 3, thermistor signal indicating a temperature at or below the reactivation temperature in the embodiment of FIG. 4), the PID controller is programmed to then resume pulsed actuation of the power supply switch for operating the heating element based on the adjusted (reduced) temperature setting stored at the PID controller. In some embodiments (e.g., the embodiments of FIGS. 3 and 4), the controller may reduce the setpoint temperature in response to the indicated overheat condition, without temporarily shutting off power to the heating element.

Accordingly, in operating an exemplary heater in accordance with the present application, a heating element of the heater is powered through a PID controller, which modulates cycling of a power supply switch based on a temperature setpoint setting and heating element temperature feedback from a thermistor proximate the heating element. When the PID controller receives an indication that an overheat sensing element has reached an overheat temperature (e.g., a temperature at least slightly below the functioning temperature of the thermal fuse) at or near a thermal fuse in the heater, the PID controller reduces or shuts off the power supply switch and reduces the temperature setpoint setting by a predetermined amount. When the PID controller receives a subsequent indication that the overheat sensing element has reached a reactivation temperature (e.g., a temperature at least slightly below the overheat temperature), the PID controller resumes actuation of the power supply switch based on the reduced temperature setpoint setting.

Although the invention has been disclosed and described with respect to certain exemplary embodiments, certain variations and modifications may occur to those skilled in the art upon reading this specification. Any such variations and modifications are within the purview of the invention notwithstanding the defining limitations of the accompanying claims and equivalents thereof. Accordingly, departures may be made from such details without departing from the spirit or scope of the applicant's general inventive concept.

We claim:

1. A fluid heater comprising:
   a heating circuit comprising a heating element and a thermal fuse disposed in a heater housing, and a power supply switch disposed in a control unit, the thermal fuse being configured to fail at a predetermined critical temperature to open the heating circuit when the thermal fuse reaches the critical temperature;
   a temperature monitoring circuit comprising a thermistor disposed in the heater housing proximate the heating element, and a temperature gauge disposed in the control unit;
   a controller disposed in the control unit and in circuit communication with the temperature gauge and the power supply switch, the controller being configured to operate the power supply switch in response to feedback from the temperature gauge to maintain the heater at a setpoint temperature; and
   an overheat sensing element, separate from the power control switch, the overheat sensing element being disposed in the heater housing proximate to the thermal fuse and in circuit communication with the controller to provide an indication to the controller when the overheat sensing element reaches an overheat temperature, the overheat temperature being lower than the critical temperature;
   wherein the controller is configured to operate the power supply switch to reduce or shut off power to the heating element in response to receiving the indication that the overheat sensing element has reached the overheat temperature.

2. The fluid heater of claim 1, wherein the overheat sensing element comprises a thermal switch.

3. The fluid heater of claim 2, wherein the thermal switch is disposed in the temperature monitoring circuit, such that a loss of the feedback from the temperature gauge provides the indication to the controller that the overheat sensing element has reached the overheat temperature.

4. The fluid heater of claim 1, wherein the overheat sensing element comprises a second thermistor.

5. The fluid heater of claim 1, wherein the overheat sensing element is disposed in an overheat sensing circuit separate from the temperature monitoring circuit, the overheat sensing circuit being connected with the controller to provide the indication to the controller when the overheat sensing element has reached the overheat temperature.

6. The fluid heater of claim 1, wherein the control unit further comprises a user operable setpoint element in circuit communication with the controller to communicate the setpoint temperature to the controller.

7. The fluid heater of claim 1, wherein after the controller shuts off power to the heating element in response to receiving the indication that the overheat sensing element has reached the overheat temperature, the controller is configured to reactivate the heating element when the overheat sensing element reaches a reactivation temperature, the reactivation temperature being lower than the overheat temperature.

8. The fluid heater of claim 7, wherein the reactivation temperature is at least about 30° C. below the overheat temperature.

9. The fluid heater of claim 1, wherein the controller is configured to automatically reduce the setpoint temperature in response to receiving the indication that the overheat sensing element has reached the overheat temperature.

10. The fluid heater of claim 1, wherein the controller comprises a proportional-integral-derivative (PID) controller.

11. The fluid heater of claim 1, wherein the controller is configured to provide pulsed power to the heating element.

12. The fluid heater of claim 1, wherein the overheat temperature is between about 15° C. and about 25° C. lower than the critical temperature.

13. A heated regulator comprising:
a body comprising an internal passage extending between an inlet port and an outlet port, a body seat, and a cavity extending to an access port in the body;
a poppet movable with respect to the body seat to control fluid flow through the internal passage; and
the fluid heater of claim 1, wherein the heater housing is installed in the cavity through the access port.

14. The heated regulator of claim 13, wherein the overheat sensing element is disposed in an overheat sensing circuit separate from the temperature monitoring circuit, the overheat sensing circuit being connected with the controller to provide the indication to the controller when the overheat sensing element has reached the overheat temperature.

15. The heated regulator of claim 13, wherein after the controller shuts off power to the heating element in response to receiving the indication that the overheat sensing element has reached the overheat temperature, the controller is configured to reactivate the heating element when the overheat sensing element reaches a reactivation temperature, the reactivation temperature being lower than the overheat temperature.

16. The fluid heater of claim 1, wherein the control unit is separate from the heater housing.

17. The fluid heater of claim 1, wherein the heating element is embedded in a thermally conductive compound within the heater housing.

18. The fluid heater of claim 1, wherein the temperature gauge is separate from the controller.

19. The fluid heater of claim 2, wherein the thermal switch comprises a normally open thermal switch provided in parallel with the thermistor, such that when the thermal switch reaches the overheat temperature, the thermal switch closes to short out the thermistor, resulting in a loss of the feedback from the temperature gauge to provide the indication to the controller that the overheat sensing element has reached the overheat temperature.

20. The fluid heater of claim 5, wherein the overheat sensing element comprises a thermal switch that opens at the overheat temperature to interrupt transmission of a verification signal to the controller, to provide the indication to the controller that the overheat sensing element has reached the overheat temperature.

* * * * *